(12) United States Patent
Lee et al.

(10) Patent No.: US 12,333,969 B2
(45) Date of Patent: Jun. 17, 2025

(54) SYSTEM AND METHOD FOR INSPECTING DISPLAY DEVICE HAVING INPUT SENSOR

(71) Applicant: SAMSUNG DISPLAY CO., LTD., Yongin-si (KR)

(72) Inventors: Il Ho Lee, Yongin-si (KR); Taejoon Kim, Yongin-si (KR); Jinwoo Park, Yongin-si (KR); Yerin Oh, Yongin-si (KR); Seungrok Lee, Yongin-si (KR); Wankee Jun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/498,658

(22) Filed: Oct. 31, 2023

(65) Prior Publication Data

US 2024/0242645 A1 Jul. 18, 2024

(30) Foreign Application Priority Data

Jan. 16, 2023 (KR) .......................... 10-2023-0005819

(51) Int. Cl.
| | | |
|---|---|---|
| G09G 3/00 | (2006.01) | |
| G06F 3/041 | (2006.01) | |
| G06F 3/044 | (2006.01) | |
| G09G 3/3208 | (2016.01) | |

(52) U.S. Cl.
CPC .......... *G09G 3/006* (2013.01); *G06F 3/0412* (2013.01); *G06F 3/04166* (2019.05); *G06F 3/0418* (2013.01); *G06F 3/0446* (2019.05); *G09G 3/3208* (2013.01); *G09G 2354/00* (2013.01)

(58) Field of Classification Search
CPC .. G09G 3/006; G09G 3/3208; G09G 2354/00; G06F 3/0412; G06F 3/04166; G06F 3/0418; G06F 3/0446; G06F 3/041; H10K 71/70; H10K 59/40; G01R 27/2605; G01R 31/2825; G01R 31/2837; G01R 31/2841
See application file for complete search history.

(56) References Cited

U.S. PATENT DOCUMENTS

| | | | |
|---|---|---|---|
| 10,528,194 B2 | 1/2020 | Ku | |
| 2015/0277659 A1* | 10/2015 | Lu | G06F 3/04186 345/173 |
| 2020/0301477 A1* | 9/2020 | Bouthinon | G06V 40/1318 |
| 2023/0154397 A1* | 5/2023 | Park | G09G 3/3233 345/204 |
| 2023/0333691 A1* | 10/2023 | Kang | G06F 3/0446 |

FOREIGN PATENT DOCUMENTS

| | | |
|---|---|---|
| KR | 10-2007-0117358 | 12/2007 |
| KR | 10-1763939 | 8/2017 |
| KR | 10-2345662 | 12/2021 |

* cited by examiner

*Primary Examiner* — Amit Chatly
(74) *Attorney, Agent, or Firm* — F. Chau & Associaties, LLC

(57) ABSTRACT

An inspection system includes a display device product comprising a display panel and an input sensor; and an inspection device comprising an inspection signal generator configured to provide to the display panel an inspection signal indicative of a first image pattern, a memory configured to store a reference signal responsive to a second image pattern, and a noise detector configured to receive from the input sensor a sensing signal responsive to the first image pattern, detect a first noise based on the sensing signal, and detect a second noise based on the reference signal.

20 Claims, 15 Drawing Sheets

FIG. 13A

| | PT_W | | | |
|---|---|---|---|---|
| SS | 309 | 308 | 304 | 294 |
| | 294 | 294 | 298 | 310 |
| | 300 | 301 | 309 | 298 |
| | 297 | 309 | 294 | 303 |

FIG. 13B

| | | | | |
|---|---|---|---|---|
| JT1 | −1 | 0 | −1 | 0 |
| | 0 | −1 | 0 | 1 |
| | 0 | 1 | 1 | 0 |
| | −1 | −1 | −1 | 0 |

FIG. 14A

| PT_9 | | | |
|---|---|---|---|
| 311 | 307 | 309 | 311 |
| 284 | 307 | 284 | 296 |
| 309 | 301 | 305 | 292 |
| 307 | 291 | 283 | 282 |

(SS label at left spanning rows)

FIG. 14B

| JT1 | 2 | -1 | 5 | 17 |
|---|---|---|---|---|
| | -10 | 13 | -14 | -14 |
| | 9 | 0 | -4 | -6 |
| | 10 | -18 | -11 | -21 |

FIG. 16A

| | PT_W | | | |
|---|---|---|---|---|
| SS | 303 | 323 | 310 | 251 |
| | 298 | 254 | 331 | 294 |
| | 304 | 322 | 351 | 311 |
| | 274 | 299 | 335 | 275 |

FIG. 16B

| | | | | |
|---|---|---|---|---|
| JT1 | 1 | 1 | −1 | 0 |
| | 0 | 0 | −1 | −1 |
| | 0 | −1 | 1 | −1 |
| | 1 | −1 | 1 | 1 |

FIG. 17A

| REF | PT9 | | | |
|---|---|---|---|---|
| | 311 | 307 | 309 | 311 |
| | 284 | 307 | 284 | 296 |
| | 309 | 301 | 305 | 292 |
| | 307 | 291 | 283 | 282 |

FIG. 17B

| JT2 | 8 | -16 | -1 | 60 |
|---|---|---|---|---|
| | -14 | 53 | -47 | 2 |
| | 5 | -21 | -46 | -19 |
| | 33 | -8 | -52 | 7 |

SYSTEM AND METHOD FOR INSPECTING DISPLAY DEVICE HAVING INPUT SENSOR

CROSS-REFERENCE

This application claims priority under 35 U.S.C. § 119 to Korean Patent Application No. 10-2023-0005819, filed on Jan. 16, 2023 in the Korean Intellectual Property Office, the disclosure of which is incorporated by reference herein in its entirety.

FIELD

Embodiments of the present disclosure relate to a system and a method for inspecting a display device having an input sensor.

DISCUSSION

Multimedia electronic devices such as a television, a mobile phone, a tablet computer, a navigation device, a game console, or the like, may include a display device for displaying an image. The electronic devices may include a display device capable of providing a touch-based input scheme that allows a user to intuitively and conveniently input information or a command, in addition to a typical input scheme such as a button, a keyboard, and/or a mouse.

SUMMARY

Embodiments of the present disclosure may provide a system and/or a method for inspecting a display device having an input sensor.

According to an embodiment, an inspection system may include a display device product comprising a display panel and an input sensor; and an inspection device comprising an inspection signal generator configured to provide to the display panel an inspection signal indicative of a first image pattern, a memory configured to store a reference signal responsive to a second image pattern, and a noise detector configured to receive from the input sensor a sensing signal responsive to the first image pattern, detect a first noise based on the sensing signal, and detect a second noise based on the reference signal.

According to an embodiment, an inspection system may include a display device to be inspected including a display panel and an input sensor, and an inspection device for providing an inspection signal to the display panel and determining a defect of the display device to be inspected based on a sensing signal received from the input sensor. The inspection device detects a first noise based on the sensing signal received when providing the inspection signal of a first image pattern to the display panel, calculates a second noise corresponding to a second image pattern based on the sensing signal, and determines the defect of the display device to be inspected based on the first noise and the second noise.

In an implementation, the inspection device may include an inspection signal generator for outputting the inspection signal corresponding to the first image pattern, a memory for storing the sensing signal corresponding to the second image pattern of a non-defective display device as a reference signal, a noise detector for detecting the first noise based on the sensing signal and calculating the second noise corresponding to the second image pattern based on the sensing signal and the reference signal stored in the memory, and a pass-fail determiner for outputting a pass-fail signal based on the first noise and the second noise.

In an implementation, the first noise may be a difference value between two sensing signals received when the inspection signal of the first image pattern is provided to the display panel for at least two frames.

In an implementation, the second noise may be a difference value between the sensing signal and the reference signal.

In an implementation, the pass-fail determiner may output the pass-fail signal indicating that the display device to be inspected may be non-defective when both the first noise and the second noise are within a threshold.

In an implementation, the input sensor may include a transmission electrode and a reception electrode, and the sensing signal may be a capacitance between the transmission electrode and the reception electrode.

In an implementation, the first image pattern may be a white image pattern.

In an implementation, the input sensor may be disposed on the display panel and include a plurality of transmission electrodes and a plurality of reception electrodes.

In an implementation, the inspection system may further include a readout circuit for providing transmission signals to the plurality of transmission electrodes and receiving reception signals from the plurality of reception electrodes, and the readout circuit may output the reception signals as the sensing signals.

According to an embodiment, an inspection method may include providing an inspection signal corresponding to a first image pattern to a display panel of a display device, receiving a sensing signal from an input sensor of the display device, determining a defect of the display device based on a first noise of the sensing signal, providing the inspection signal corresponding to a second image pattern to the display panel, receiving the sensing signal from the input sensor, determining the defect of the display device based on a second noise of the sensing signal, and storing the sensing signal for the second image pattern in a memory when the display device may be non-defective.

In an implementation, the first noise may be a difference value between two sensing signals received when the inspection signal of the first image pattern may be provided to the display panel for at least two frames.

In an implementation, the second noise may be a difference value between two sensing signals received while the inspection signal of the second image pattern may be provided to the display panel for the at least two frames.

In an implementation, the input sensor may include a transmission electrode and a reception electrode, and the sensing signal may be a capacitance between the transmission electrode and the reception electrode.

In an implementation, the first image pattern may be a white image pattern.

According to an embodiment, an inspection method may include providing an inspection signal corresponding to a first image pattern to a display panel of a display device to be inspected, receiving a sensing signal from an input sensor of the display device to be inspected, detecting a first noise for the sensing signal, calculating a second noise corresponding to a second image pattern based on the sensing signal and a reference signal stored in a memory, receiving the sensing signal from the input sensor, and determining a defect of the display device to be inspected based on the first noise and the second noise.

In an implementation, the first noise may be a difference value between two sensing signals received while the inspection signal of the first image pattern is provided to the display panel for at least two frames.

In an implementation, the second noise may be a difference value between the sensing signal and the reference signal.

In an implementation, the input sensor may include a transmission electrode and a reception electrode, and the sensing signal may be a capacitance between the transmission electrode and the reception electrode.

In an implementation, the input sensor may be disposed on the display panel and include a plurality of transmission electrodes and a plurality of reception electrodes.

In an implementation, the determining of the defect of the display device to be inspected based on the first noise and the second noise may include determining the display device to be inspected to be non-defective when both the first noise and the second noise are within a threshold.

BRIEF DESCRIPTION OF THE DRAWINGS

The above and other embodiments of the present disclosure will become apparent by describing in detail embodiments thereof with reference to the accompanying drawings.

FIG. 13A is a tabular diagram showing a sensing signal when an inspection signal corresponding to a first image pattern is provided to a display panel as an example.

FIG. 13B is a tabular diagram showing a first noise based on a sensing signal shown in FIG. 13A as an example.

FIG. 14A is a tabular diagram showing a sensing signal when an inspection signal corresponding to a second image pattern is provided to a display panel as an example.

FIG. 14B is a tabular diagram showing a first noise based on a sensing signal shown in FIG. 13A and a sensing signal shown in FIG. 14A as an example.

FIG. 16A is a tabular diagram showing a sensing signal when an inspection signal corresponding to a first image pattern is provided to a display panel as an example.

FIG. 16B is a tabular diagram showing a first noise based on a sensing signal shown in FIG. 16A as an example.

FIG. 17A is a tabular diagram showing a reference signal stored in a memory as an example.

FIG. 17B is a tabular diagram showing a second noise based on a sensing signal shown in FIG. 16A and a reference signal shown in FIG. 17A.

DETAILED DESCRIPTION

Figure 1:
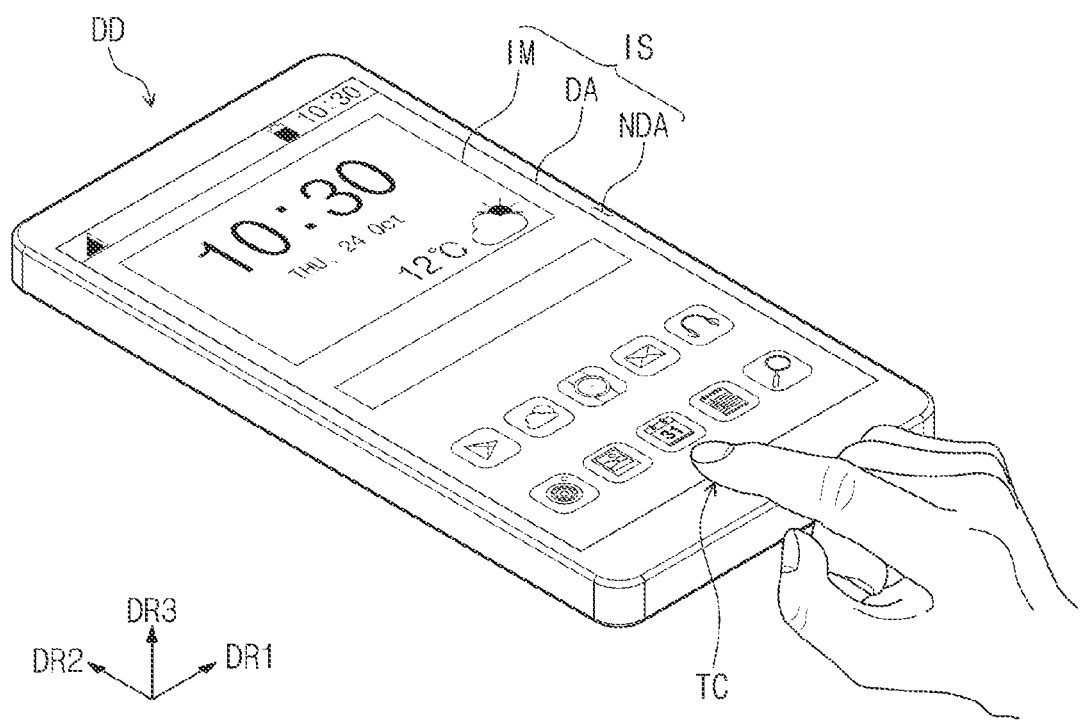
FIG. 1 is a perspective view diagram of a display device according to an embodiment of the present disclosure.

In the description that follows, when a component such as a region, a layer, a portion, or the like is referred to as being "on", "connected to", or "coupled to" another component, it means that the component may be directly disposed on or directly connected/coupled to the other component, or a third component may be disposed between the component and the other component.

Like reference numerals may refer to like components. In addition, in the drawings, thicknesses, ratios, and dimensions of components may be exaggerated for effective description of technical content. Moreover, the term "and/or" may include one or more combinations that any or all the associated components may define.

Terms such as first, second, and the like may be used to describe various components, but the components shall not be limited by such terms. The above terms may be used primarily for distinguishing one component from another. For example, without departing from the scope of the present disclosure, a first component may be named as a second component, and similarly, the second component may also be named as the first component. The singular expression may include the plural expression unless the context clearly dictates otherwise.

In addition, terms such as "beneath", "below", "on", "above" may be used to describe the relationships of the components shown in the drawings. The above and like terms indicate relative concepts, and are generally described with reference to directions as indicated in the drawings.

It shall be understood that terms such as "include" or "have" are intended to specify that a feature, a number, a step, an operation, a component, a part, or a combination thereof described in the specification may be present, and do not preclude a possibility of addition or existence of one or more other features, numbers, steps, operations, components, parts, or combinations thereof.

Unless otherwise defined, terms including technical and scientific terms as used herein have the same meaning as commonly understood by one of ordinary skill in the art to which this disclosure pertains. It shall be understood that each term, such as those defined in commonly used dictionaries, shall be interpreted as having a meaning that may be consistent with its meaning in the context of the relevant art, and shall not be interpreted in an idealized or overly formal sense unless expressly so defined herein.

Hereinafter, embodiments of the present disclosure will be described by way of non-limiting example with reference to accompanying drawings.

FIG. 1 illustrates a perspective view of a display device DD according to an embodiment of the present disclosure.

As shown in FIG. 1, the display device DD may display an image IM via a display surface IS. The display surface IS may be parallel to a plane defined by a virtual line extending in a first direction DR1 and a virtual line extending in a second direction DR2. A normal direction to the display surface IS, such as a thickness direction of the display device DD, may be defined as a third direction DR3.

Front or top surfaces and rear or bottom surfaces of parts or members to be described, infra, may be distinguished by the third direction DR3. However, the first to third directions DR1, DR2, and DR3 shown in the present embodiment are examples, without limitation thereto.

In an embodiment of the present disclosure, although the display device DD having the planar display surface IS may be shown, the present disclosure need not be limited thereto. The display device DD may alternately or further include a curved display surface. The display device DD may include a stereoscopic display surface. The stereoscopic display surface may include a plurality of display areas directed in different directions, and may include, for example, a polygonal columnar display surface.

The display device DD according to the present embodiment may be a rigid display device. However, the present disclosure need not be limited thereto. For example, a display device DD according to the present disclosure may be a flexible display device. The flexible display device may include a foldable display device capable of being folded, a bendable display device in which a partial area may be bent, a rollable display device and/or a slideable display device.

In the present embodiment, FIG. 1 illustrates the display device DD, which may be applied to a mobile phone terminal. The display device DD according to the present disclosure may be similarly applied to small and medium-sized electronic devices such as a smart watch and a game console, respectively.

As shown in FIG. 1, the display surface IS may include an image area DA on which the image IM may be displayed, and a bezel area NDA adjacent to the image area DA. The bezel area NDA may be an area where the image need not be displayed. FIG. 1 shows a clock and icon images as an example of the image IM.

As shown in FIG. 1, the image area DA may have a substantially rectangular shape. The term "substantially rectangular shape" may include a rectangular shape in a mathematical sense, and/or a rectangular shape having one or more corner areas in which a curved boundary may be defined instead of a vertex, without limitation thereto.

The bezel area NDA may surround the image area DA. However, the present disclosure need not be limited thereto, and the image area DA and the bezel area NDA may be designed with different shapes. The bezel area NDA may be disposed on one side of the image area DA, without limitation thereto. The bezel area NDA need not be exposed to the outside based on a form of coupling the display device DD with another component of an electronic device, without limitation thereto.

The display device DD according to an embodiment of the present disclosure may sense a user's input TC applied from the outside. The user's input TC may be one or a combination of various external inputs such as an effect of a user's body part or a tool such as a stylus pen. For example, the display device DD may sense a change in one or a combination of reflected light, temperature, pressure, an ultrasonic wave, and/or electromagnetism from the user to sense the user's input TC. In the present embodiment, the description may be made assuming that the user's input TC may be a touch input by a user's hand applied to a front surface of the display device DD, but this is an example without limitation thereto. As described above, the user's input TC may be provided in various forms. In addition, the display device DD may sense the user's input TC as applied to a side surface or a rear surface of the display device DD based on a structure of the display device DD, without limitation thereto.

Figure 2:
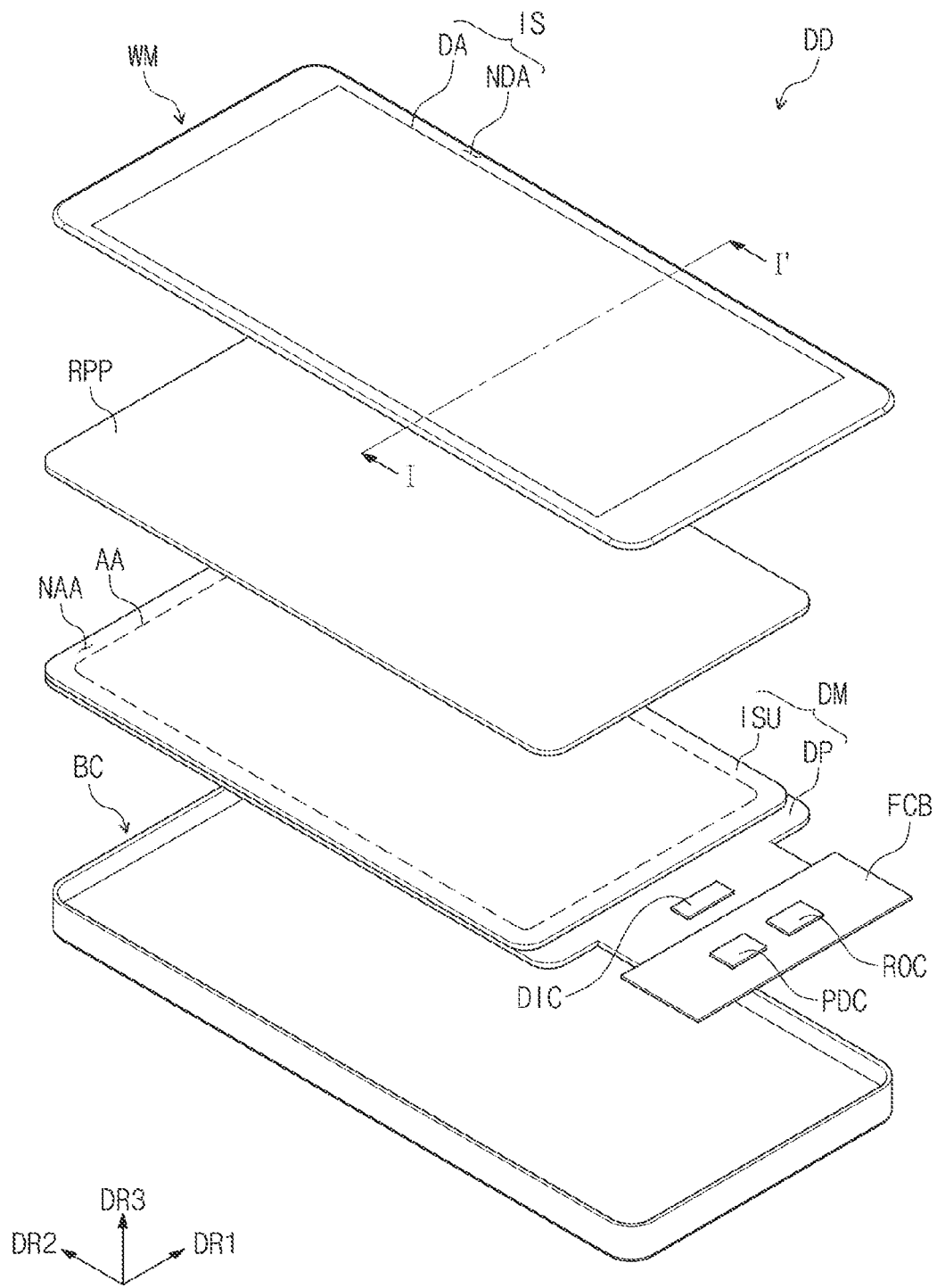
FIG. 2 is an exploded perspective view diagram of a display device according to an embodiment of the present disclosure.

FIG. 2 illustrates an exploded perspective view of a display device according to an embodiment of the present disclosure.

Referring to FIGS. 1 and 2, the display device DD may include a window WM, an anti-reflection panel RPP, a display module DM, a printed circuit board FCB, a driving integrated circuit DIC, and a lower casing BC. As shown in FIGS. 1 and 2, in the present embodiment, the window WM and the lower casing BC are coupled to each other to form an outer surface of the display device DD.

The window WM protects a top surface of a display panel DP. The window WM may contain an optically transparent insulating material. For example, the window WM may include a front surface FS containing glass or plastic. The window WM may have a multi-layer structure or a single-layer structure. For example, the window WM may include a plurality of plastic films bonded together with an adhesive, or may include a glass substrate and a plastic film bonded together with the adhesive, without limitation thereto.

The anti-reflection panel RPP may be placed beneath the window WM. The anti-reflection panel RPP reduces a reflectance of external light incident from above the window WM. In an embodiment of the present disclosure, the anti-reflection panel RPP may be omitted, integrated or embedded in the display module DM.

The display module DM may display the image IM and sense the external input. The display module DM may include the display panel DP and an input sensor ISU, without limitation thereto.

In the display panel DP, an active area AA and a peripheral area NAA respectively corresponding to the image area DA and the bezel area NDA shown in FIG. 1 may be defined. The display panel DP may be a component that substantially generates the image IM. The image IM generated by the active area AA of the display panel DP may be recognized by the user from the outside via the window WM. The driving integrated circuit DIC may be disposed in the peripheral area NAA of the display panel DP.

The input sensor ISU senses external inputs applied from the outside. For example, the input sensor ISU may sense the user's input TC provided to the window WM.

The display panel DP may be electrically connected to the printed circuit board FCB. The printed circuit board FCB may include various driving circuits for driving the display panel DP and the input sensor ISU. In an embodiment, the printed circuit board FCB may include a panel driving circuit PDC for driving the display panel DP and a readout circuit ROC for driving the input sensor ISU. The panel driving circuit PDC may provide signals for controlling the driving integrated circuit DIC. In an embodiment, each of the panel driving circuit PDC and the readout circuit ROC may be formed as an integrated circuit and mounted on the display panel DP.

The lower casing BC may be coupled to the window WM. The lower casing BC may contain a material with a relatively high rigidity. For example, the lower casing BC may include a plurality of frames and/or plates containing glass, plastic, metal, or a combination thereof. The lower casing BC may stably protect components of the display device DD, accommodated in an inner space, from an external impact.

Figure 3:
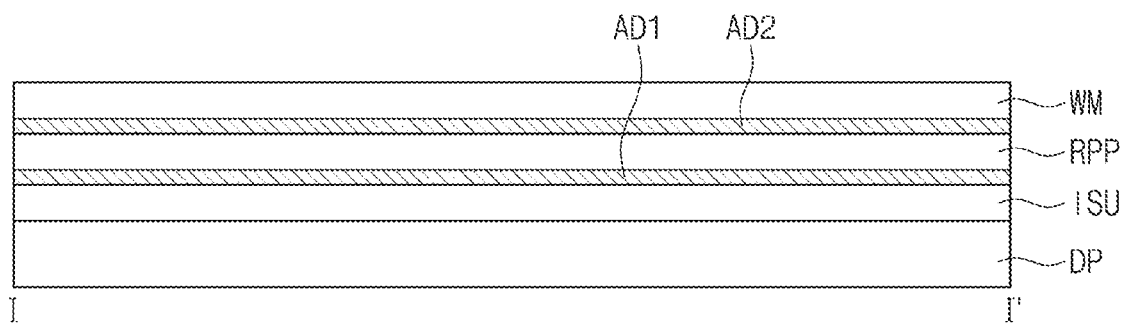
FIG. 3 is a cross-sectional view diagram taken along a cutting line I-I' shown in FIG. 2.
Figure 3:
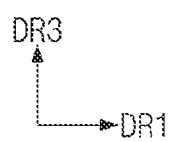

FIG. 3 illustrates a cross-sectional view taken along a cutting line I-I' shown in FIG. 2.

FIG. 3 shows a cross-section of the display device DD defined by the first direction DR1 and the third direction DR3. In FIG. 3, the components of the display device DD are shown for ease of explanation to describe a stacking relationship thereof.

The display device DD according to an embodiment of the present disclosure may include the display panel DP, the input sensor ISU, an anti-reflector such as the anti-reflection panel RPP, and the window WM. At least some of the components of the display panel DP, the input sensor ISU, the anti-reflection panel RPP, and the window WM may be formed by a subsequent process or may be coupled to each other via an adhesive layer or member. For example, the input sensor ISU and the anti-reflection panel RPP may be coupled to each other by an adhesive member AD1. The anti-reflection panel RPP and the window WM may be coupled to each other by an adhesive member AD2.

The adhesive layers or members AD1 and AD2 may be transparent adhesive members such as a pressure sensitive adhesive film (PSA), an optically clear adhesive film (OCA), or an optically clear adhesive resin (OCR). The adhesive member to be described infra may include a conventional adhesive. In an embodiment of the present disclosure, the anti-reflection panel RPP and the window WM may be replaced with other components or omitted.

In FIG. 3, the input sensor ISU, the anti-reflector or anti-reflection panel RPP, and the window WM that may be formed via the subsequent process with the display panel DP, may be directly disposed on the display panel DP. Herein, an expression "a component B is directly disposed on a component A" means that a separate adhesive layer or member need not be disposed between the component A and the component B. The component B may be formed via a subsequent process on a base surface provided by the component A, such as after the component A is formed.

In the present embodiment, the anti-reflection panel RPP and the window WM are of each of a "panel" type, and the input sensor ISU may be of a "layer" type. The "panel" type may include a base layer providing a base surface, such as a synthetic resin film, a composite material film, a glass substrate, or the like; but the "layer" type may omit the base layer. In other words, components of the "layer" type are arranged on base surfaces provided by other components. In an embodiment of the present disclosure, the anti-reflection panel RPP and the window WM may be of the "layer" type.

The display panel DP generates the image, and the input sensor ISU obtains coordinate information of the external input, such as a touch event. The display device DD according to an embodiment of the present disclosure may further include a protective member disposed on a bottom or rear surface of the display panel DP. The protective member and the display panel DP may be coupled to each other via the adhesive member.

The display panel DP according to an embodiment of the present disclosure may be a light-emitting display panel, but need not be particularly limited thereto. For example, the display panel DP may be an organic light-emitting display panel or a quantum dot light-emitting display panel. The panels are distinguished from each other based on a constituent material of a light-emitting element. A light-emitting layer of the organic light-emitting display panel may contain an organic light-emitting material. A light-emitting layer of a quantum dot light-emitting display panel may contain quantum dots and/or quantum rods. Hereinafter, the display panel DP may be described as an organic light-emitting display panel, without limitation thereto.

The anti-reflection panel RPP reduces the reflectance of the external light incident from above the window WM. The anti-reflection panel RPP according to an embodiment of the present disclosure may include a retarder and a polarizer. The retarder may be of the film type or a liquid crystal coating type. The polarizer may also be of the film type or the liquid crystal coating type. The film type may include a stretchable synthetic resin film, and/or the liquid crystal coating type may include liquid crystals arranged in a predetermined arrangement. The retarder and the polarizer may further include a protective film. The retarder and the polarizer themselves, or the protective films thereof, may be defined as a base layer of the anti-reflection panel RPP.

The anti-reflection panel RPP according to an embodiment of the present disclosure may include color filters. The color filters have a certain arrangement. The arrangement of the color filters may be determined in consideration of emitted light colors from pixels included in the display panel DP. The anti-reflection panel RPP may further include a black matrix adjacent to the color filters.

The anti-reflection panel RPP according to an embodiment of the present disclosure may include a destructive interference structure. For example, the destructive interference structure may include a first reflective layer and a second reflective layer disposed on different layers. First reflected light and second reflected light reflected from the first reflective layer and the second reflective layer, respectively, may cause destructive interference, and thus the reflectance of the external light may be reduced.

The window WM according to an embodiment of the present disclosure may include the glass substrate and/or the synthetic resin film. The window WM need not be limited to be of a single layer. The window WM may include two or more films coupled together by the adhesive member. The window WM may further include a functional coating layer. The functional coating layer may include an anti-fingerprint layer, an anti-reflection layer, a hard coating layer, and the like.

The input sensor ISU and the display panel DP will be described in greater detail infra.

Figure 4:
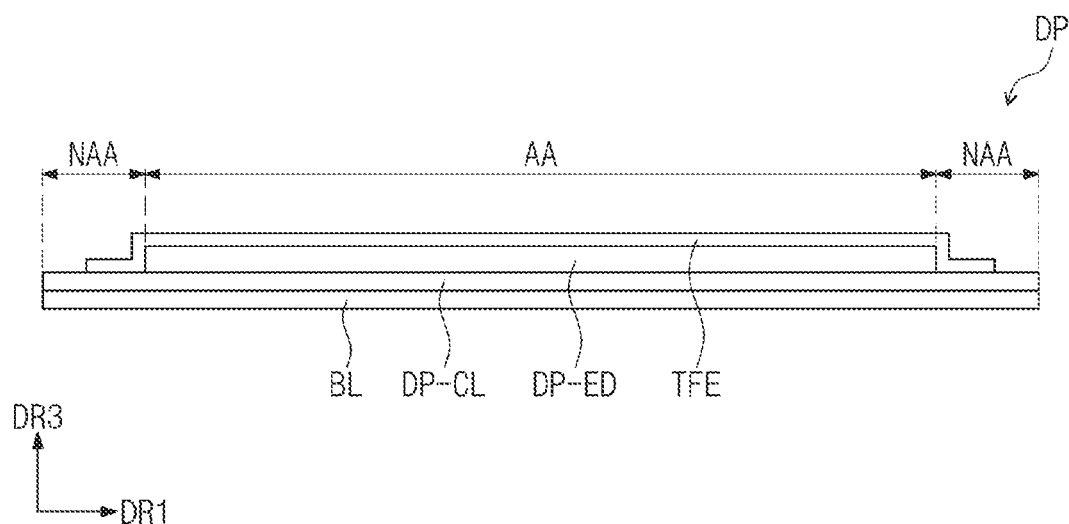
FIG. 4 is a cross-sectional view diagram of a display panel shown in FIG. 3.

FIG. 4 illustrates a cross-sectional view of the display panel DP shown in FIG. 3.

As shown in FIG. 4, the display panel DP may include a base layer BL, a circuit element layer DP-CL disposed on the base layer BL, a light-emitting element layer DP-ED, and a thin film encapsulation layer TFE. The active area AA and the peripheral area NAA, respectively corresponding to the image area DA and the bezel area NDA shown in FIG. 1, may be defined in the display panel DP. Herein, an expression such as "one area/portion corresponds to another area/portion" means that the one area/portion and the other area/portion may have some correspondence such as, for example, they may "overlap each other", but it shall be understood that such areas are not limited to having the same areas, sizes and/or shapes as each other.

The base layer BL may include at least one synthetic resin film. The base layer BL may further include the glass substrate, a metal substrate, an organic/inorganic composite substrate, or the like.

The circuit element layer DP-CL may be disposed on the base layer BL. The circuit element layer DP-CL may include at least one insulating layer, and circuit elements. The insulating layer may include at least one inorganic layer and at least one organic layer. The circuit elements may include signal lines, a pixel driving circuit, and the like.

The light-emitting element layer DP-ED may be disposed on the circuit element layer DP-CL. The light-emitting element layer DP-ED may include organic light-emitting diodes (OLED) as light-emitting elements. The light-emitting element layer DP-ED may further include an organic layer such as a pixel defining layer.

The thin film encapsulation layer TFE may be disposed on the light-emitting element layer DP-ED and encapsulate the light-emitting element layer DP-ED. The thin film encapsulation layer TFE may entirely cover the active area AA. The thin film encapsulation layer TFE may cover a partial area of the peripheral area NAA.

The thin film encapsulation layer TFE may include a plurality of thin films. For example, some thin films are disposed to optimize an optical efficiency, and some thin films are disposed to protect the organic light-emitting diodes, without limitation thereto.

Figure 5:
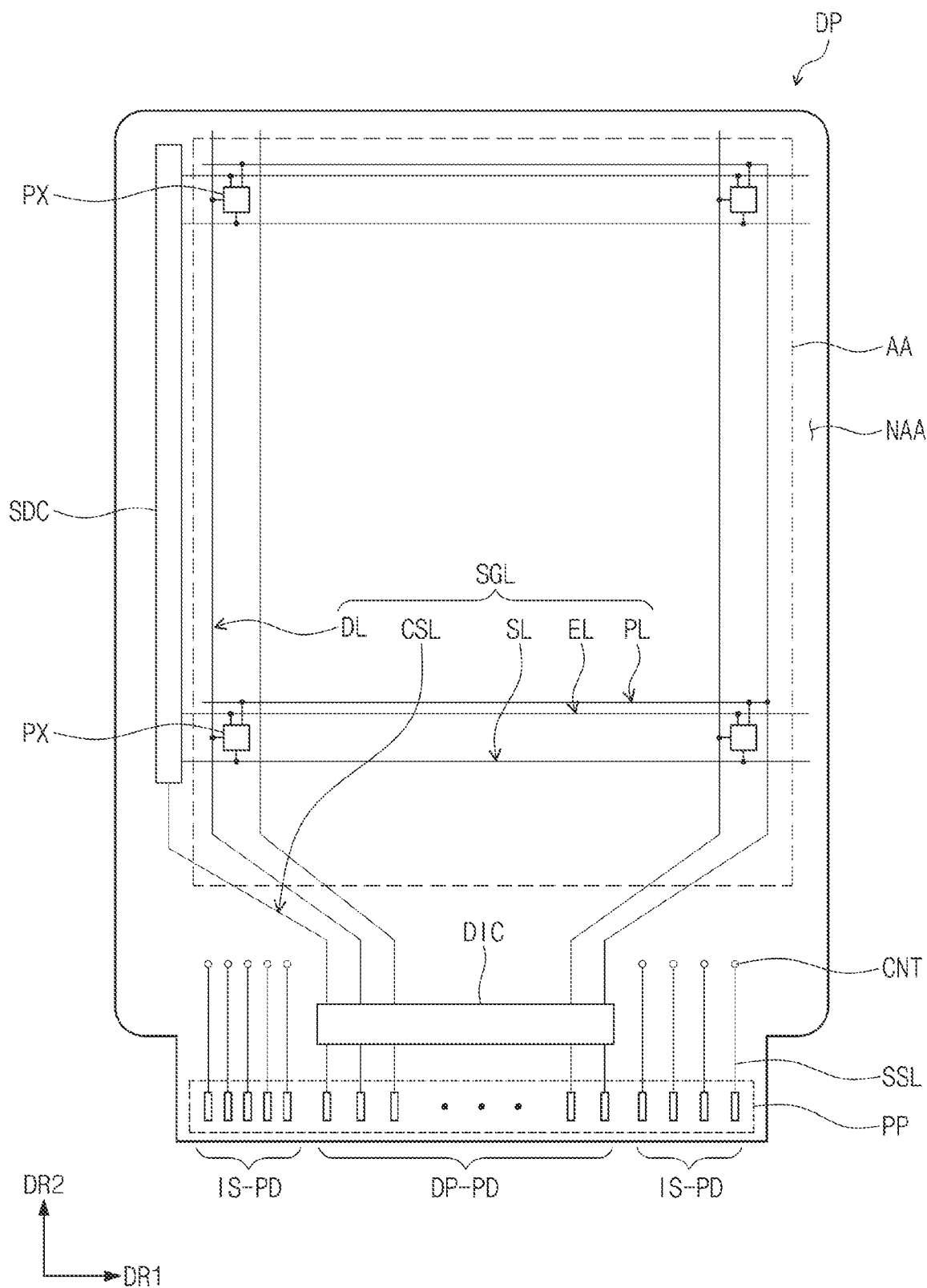
FIG. 5 is a plan view diagram of a display panel according to an embodiment of the present disclosure.

FIG. 5 illustrates a plan view of the display panel DP according to an embodiment of the present disclosure.

As shown in FIG. 5, the display panel DP may include a scan driving circuit SDC, the driving integrated circuit DIC, signal lines SGL, signal pads DP-PD and IS-PD, and pixels PX.

The scan driving circuit SDC generates scan signals and sequentially outputs the scan signals to a scan lines SL. The scan driving circuit SDC may output other control signals as well as the scan signals to the pixels PX.

The scan driving circuit SDC may include transistors formed via the same process as transistors in the pixels PX, without limitation thereto.

The driving integrated circuit DIC may be electrically connected to data lines DL, a power line PL, and a control signal line CSL.

The signal lines SGL include the scan lines SL, the data lines DL, the power line PL, light emission control lines EL, and the control signal line CSL. Each of the scan lines SL, the data lines DL, and the light emission control lines EL may be connected to a respective pixel PX among the pixels PX. The power line PL may be connected in common to the pixels PX. The control signal line CSL may provide control signals and driving voltages to the scan driving circuit SDC. The power line PL may provide a voltage for operation of the pixels PX. The power line PL may include a plurality of lines providing different voltages.

In the present embodiment, the display panel DP may further include auxiliary lines SSL. The auxiliary lines SSL are signal lines connected to the input sensor ISU to be described infra with reference to FIG. 6. In an embodiment of the present disclosure, the auxiliary lines SSL may be omitted. The auxiliary lines SSL are respectively connected to contact holes CNT. The auxiliary lines SSL may be electrically connected to signal lines of the input sensor ISU via the contact holes CNT.

The signal pads DP-PD and IS-PD may include the first signal pads DP-PD and the second signal pads IS-PD. The first signal pads DP-PD may be electrically connected to the driving integrated circuit DIC. Some of the second signal pads IS-PD may be connected to the auxiliary lines SSL. The first signal pads DP-PD and the second signal pads IS-PD are disposed adjacent to each other in a pad area PP defined in a partial area of the peripheral area NAA. Stacking structures or constituent materials of the first signal pads DP-PD and the second signal pads IS-PD need not be distinguished from each other, and the first signal pads DP-PD and the second signal pads IS-PD may be formed via the same process.

Although the control signal line CSL may be shown as being connected between the driving integrated circuit DIC and the scan driving circuit SDC in FIG. 5, the present disclosure need not be limited thereto. For example, the control signal line CSL may be connected between the first signal pads DP-PD and the scan driving circuit SDC.

The active area AA may be defined as an area where the pixels PX are arranged. Each of the pixels PX may include a light-emitting element and a pixel circuit connected thereto. In an embodiment, the light-emitting element of each of the pixels PX may be the organic light-emitting diode.

In an embodiment, the scan driving circuit SDC, the signal lines SGL, the signal pads DP-PD and IS-PD, and the pixels PX may be included in the circuit element layer DP-CL shown in FIG. 3.

The first signal pads DP-PD and the second signal pads IS-PD of the display panel DP may be electrically connected to the printed circuit board FCB shown in FIG. 2. For example, the display panel DP may be electrically connected to the panel driving circuit PDC and the readout circuit ROC of the printed circuit board FCB via the first signal pads DP-PD and the second signal pads IS-PD.

A portion of the display panel DP shown in FIG. 5 may be bent. In an embodiment, a portion of the peripheral area NAA of the display panel DP may be bent, and may be bent based on a bending axis parallel to the first direction DR1.

Figure 6:
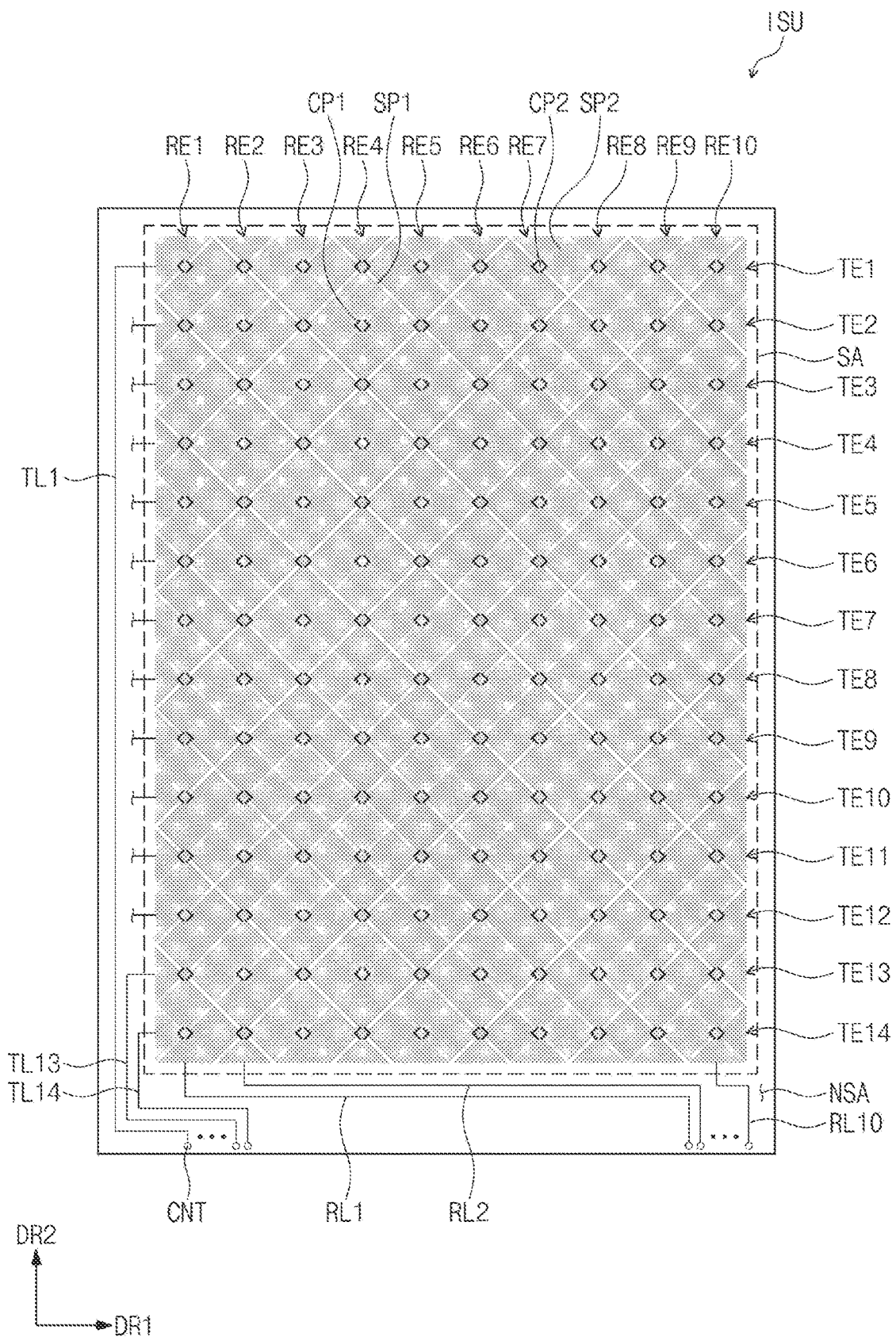
FIG. 6 is a plan view diagram illustrating a configuration of an input sensor according to an embodiment of the present disclosure.

FIG. 6 illustrates a plan view illustrating a configuration of the input sensor ISU according to an embodiment of the present disclosure.

Referring to FIG. 6, the input sensor ISU may include a sensing area SA and a non-sensing area NSA. The sensing area SA may be an area activated based on an electrical signal. For example, the sensing area SA may be an area sensing an input. The non-sensing area NSA may surround the sensing area SA. The sensing area SA may correspond to the active area AA in FIG. 5, and the non-sensing area NSA may correspond to the peripheral area NAA in FIG. 5.

The input sensor ISU may include first sensing electrodes such as transmission electrodes TE1 to TE14 and second sensing electrodes such as reception electrodes RE1 to RE10. The transmission electrodes TE1 to TE14 and the reception electrodes RE1 to RE10 are disposed in the sensing area SA. The transmission electrodes TE1 to TE14 and the reception electrodes RE1 to RE10 are electrically insulated from each other and intersect each other within the sensing area SA. As an example of the present disclosure, the input sensor ISU may include the first to fourteenth transmission electrodes TE1 to TE14 and the first to tenth reception electrodes RE1 to RE10, but the present disclosure need not be limited thereto. The number of transmission electrodes and the number of reception electrodes may be variously changed. Although the number of transmission electrodes may be shown as greater than the number of reception electrodes in FIG. 6, the present disclosure need not be limited thereto. For example, in another embodiment, the number of reception electrodes may be greater than or equal to the number of transmission electrodes.

Herein, the sensing electrodes TE1 to TE14 and the sensing electrodes RE1 to RE10 are named as the transmission electrodes TE1 to TE14 and the reception electrodes RE1 to RE10 to distinguish them from each other for ease of explanation, but, in the present disclosure, functions of the electrodes are not limited to such names. For example, depending on an operation mode, the transmission electrodes TE1 to TE14 may operate as reception electrodes as well as transmission electrodes, and/or the reception electrodes RE1 to RE10 may operate as transmission electrodes as well as reception electrodes, without limitation thereto.

Each of the first to fourteenth transmission electrodes TE1 to TE14 extends in the first direction DR1. The first to fourteenth transmission electrodes TE1 to TE14 may be spaced apart from each other in the second direction DR2. The first to fourteenth transmission electrodes TE1 to TE14 may be electrically isolated from each other. Each of the first to fourteenth transmission electrodes TE1 to TE14 may include second sensing patterns SP2 spaced apart from each other in the first direction DR1, and second connection patterns CP2 for electrically connecting the second sensing patterns SP2 to each other. The second sensing patterns SP2 and the second connection patterns CP2 may have an integral shape.

Each of the first to tenth reception electrodes RE1 to RE10 extends in the second direction DR2. The first to tenth reception electrodes RE1 to RE10 may be spaced apart from each other in the first direction DR1. The first to tenth reception electrodes RE1 to RE10 may be electrically isolated from each other. The first to tenth reception electrodes RE1 to RE10 may be disposed to intersect the first to fourteenth transmission electrodes TE1 to TE14 and electrically insulated therefrom. Each of the first to tenth reception electrodes RE1 to RE10 may include first sensing patterns SP1 spaced apart from each other in the second direction DR2, and first connection patterns CP1 for electrically connecting the first sensing patterns SP1 to each other. The first sensing patterns SP1 and the first connection patterns CP1 are disposed on different layers and do not have an integral shape.

In FIG. 6, the first sensing patterns SP1 and the second sensing patterns SP2 in a shape of a rhombus are illustrated as an example, but the present disclosure need not be limited thereto. The first sensing patterns SP1 and the second sensing patterns SP2 may have different polygonal shapes.

Figure 7:
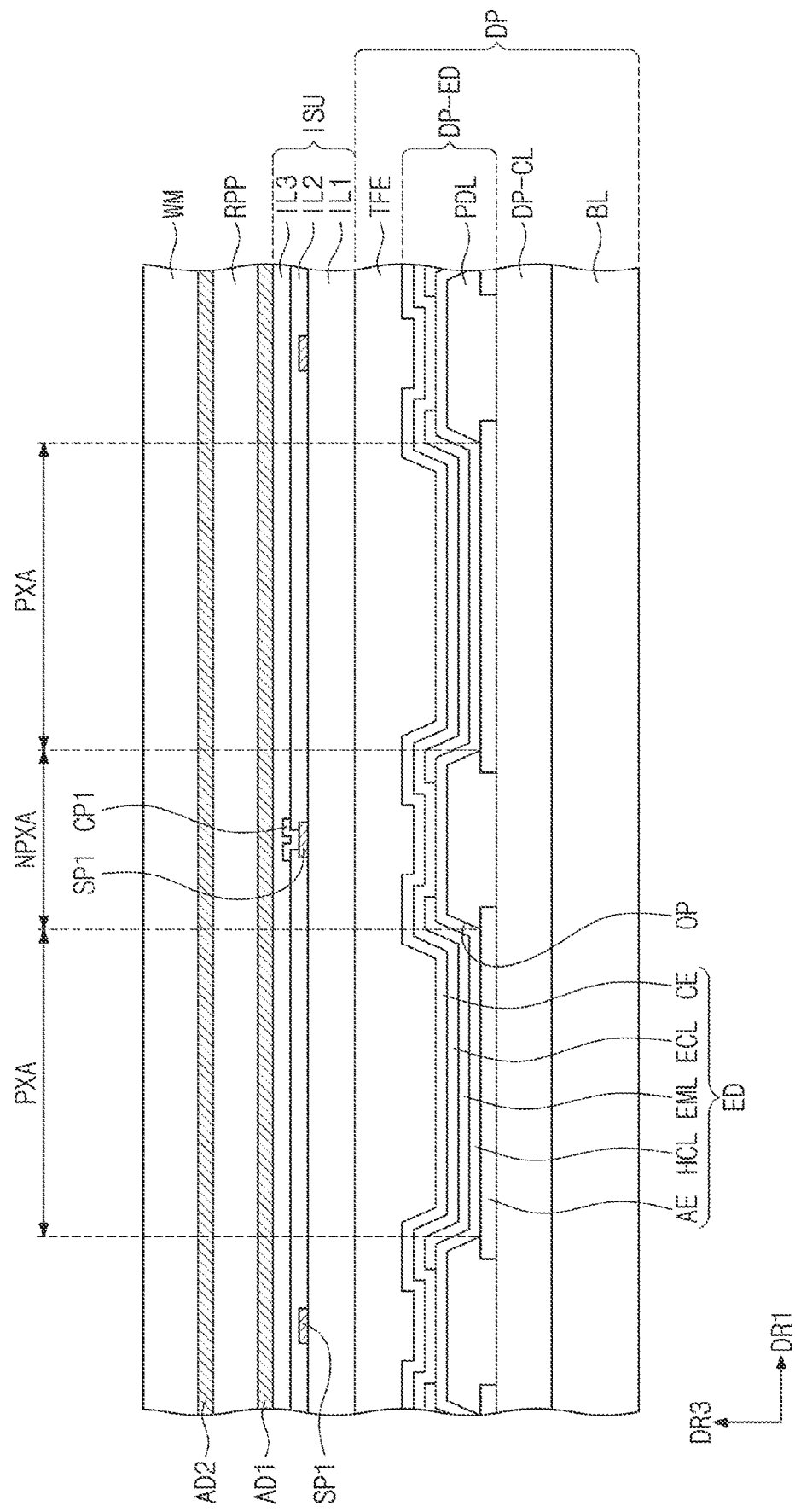
FIG. 7 is a cross-sectional view diagram of a display device according to an embodiment of the present disclosure.

Each of the first to fourteenth transmission electrodes TE1 to TE14 and each of the first to tenth reception electrodes RE1 to RE10 may have a mesh shape. As each of the first to fourteenth transmission electrodes TE1 to TE14 and each of the first to tenth reception electrodes RE1 to RE10 has the mesh shape, a parasitic capacitance with electrodes, such as a second electrode CE as shown in FIG. 7, of the display panel DP such as shown in FIG. 5, may be reduced.

The input sensor ISU may obtain location information from the external input via a change in a mutual capacitance between the first to fourteenth transmission electrodes TE1 to TE14 and the first to tenth reception electrodes RE1 to RE10.

The input sensor ISU may further include first signal lines such as first to fourteenth transmission lines TL1 to TL14 and second signal lines such as first to tenth reception lines RL1 to RL10. The first to fourteenth transmission lines TL1 to TL14 and the first to tenth reception lines RL1 to RL10 may be disposed in the non-sensing area NSA. The first to fourteenth transmission lines TL1 to TL14 are respectively electrically connected to one side of the first to fourteenth transmission electrodes TE1 to TE14, and the first to tenth reception lines RL1 to RL10 are respectively electrically connected to one side of the first to tenth reception electrodes RE1 to RE10. However, the present disclosure need not be limited thereto. In an embodiment, the input sensor ISU may further include transmission lines electrically connected to one side as well as the other sides of the first to fourteenth transmission electrodes TE1 to TE14.

One end of the first to fourteenth transmission lines TL1 to TL14 and one end of the first to tenth reception lines RL1 to RL10 may be electrically connected to the auxiliary lines SSL shown in FIG. 5 via the contact holes CNT.

The input sensor ISU may be electrically connected to the readout circuit ROC such as shown in FIG. 2 via the first to fourteenth transmission lines TL1 to TL14 and the first to tenth reception lines RL1 to RL10. The readout circuit ROC may control an operation of the input sensor ISU.

FIG. 7 illustrates a cross-sectional view of a display device according to an embodiment of the present disclosure.

As shown in FIG. 7, the display panel DP may include the base layer BL, the circuit element layer DP-CL disposed on the base layer BL, the light-emitting element layer DP-ED, and the thin film encapsulation layer TFE. Although not separately shown, the display panel DP may further include functional layers such as an anti-reflection layer, a refractive index adjustment layer, and the like.

The base layer BL may include the synthetic resin film. A synthetic resin layer may be formed on a work substrate used in a manufacture of the display panel DP. Thereafter, a conductive layer, an insulating layer, and the like are formed on the synthetic resin layer. When the working substrate may be removed, the synthetic resin layer corresponds to the base layer BL. The synthetic resin layer may be a polyimide-based resin layer, and a material thereof need not be particularly limited. In addition, the base layer BL may include the glass substrate, the metal substrate, or the organic/inorganic composite material substrate.

The circuit element layer DP-CL may include the at least one insulating layer and the circuit element. Hereinafter, the insulating layer included in the circuit element layer DP-CL may be referred to as an intermediate insulating layer. The intermediate insulating layer may include at least one intermediate inorganic film and at least one intermediate organic film. The circuit elements include the signal line, the driving circuit of the pixel, and the like. The circuit element layer DP-CL may be formed via a process of forming the insulating layer, a semiconductor layer, and a conductive layer by coating, deposition, and the like, and a patterning process of the insulating layer, the semiconductor layer, and the conductive layer by a photolithography process.

The light-emitting element layer DP-ED may include a pixel defining film PDL and a light-emitting element ED. The pixel defining film PDL may contain an organic material. A first electrode AE may be disposed on the circuit element layer DP-CL. The pixel defining film PDL may be formed on the first electrode AE. An opening OP may be defined in the pixel defining film PDL. The opening OP of the pixel defining film PDL exposes at least a portion of the first electrode AE. In an embodiment of the present disclosure, the pixel defining film PDL may be omitted.

A hole control layer HCL may be disposed on the first electrode AE. A light-emitting layer EML may be disposed on the hole control layer HCL. The light-emitting layer EML may be disposed in an area corresponding to the opening OP. For example, the light-emitting layer EML may be separately formed in each of the pixels PX shown in FIG. 5. The light-emitting layer EML may contain an organic material and/or an inorganic material. The light-emitting layer EML may generate light of a predetermined color.

An electron control layer ECL may be disposed on the light-emitting layer EML. The second electrode CE may be disposed on the electron control layer ECL. The second electrode CE may be commonly placed in the pixels PX.

The thin film encapsulation layer TFE may be disposed on the second electrode CE. The thin film encapsulation layer TFE encapsulates the light-emitting element layer DP-ED. The thin film encapsulation layer TFE may include at least one insulating layer. The thin film encapsulation layer TFE according to an embodiment of the present disclosure may include at least one inorganic film such as an encapsulating inorganic film. The thin film encapsulation layer TFE according to an embodiment of the present disclosure may include at least one organic film such as an encapsulating organic film, and at least one at least one inorganic film such as an encapsulating inorganic film.

The encapsulating inorganic film protects the light-emitting element layer DP-ED from moisture/oxygen, and the encapsulating organic film protects the light-emitting element layer DP-ED from foreign substances such as dust particles. The encapsulating inorganic film may include a silicon nitride layer, a silicon oxynitride layer, a silicon oxide layer, a titanium oxide layer, an aluminum oxide layer, or the like, but need not be particularly limited thereto. The encapsulating organic film may include an acryl-based organic film, and need not be particularly limited.

The input sensor ISU may include a base layer IL1, first and second conductive layers disposed thereon, and first and second insulating layers IL2 and IL3. The base layer IL1 may contain an inorganic material, and may include, for example, a silicon nitride layer. The inorganic film disposed at the uppermost side of the thin film encapsulation layer TFE may also contain silicon nitride, and the silicon nitride layer of the thin film encapsulation layer TFE and the base layer IL1 may be formed under different deposition conditions.

The first conductive layer may be disposed on the base layer IL1. The first conductive layer may include the first sensing pattern SP1, the second sensing pattern SP2, and the second connection pattern CP2. The second conductive layer may be disposed on the first conductive layer. The second conductive layer may include the first connection pattern CP1. The first insulating layer IL2 may be disposed between the first conductive layer and the second conductive layer. The first insulating layer IL2 separates the first conductive layer and the second conductive layer from each other in the cross-section. A contact hole for partially exposing the first sensing pattern SP1 may be defined in the first insulating layer IL2, and the first connection pattern CP1 may be connected to the first sensing pattern SP1 via the contact hole. The second insulating layer IL3 may be disposed on the first insulating layer IL2. The second insulating layer IL3 may cover the second conductive layer. The second insulating layer IL3 protects the second conductive layer from an external environment.

Mesh lines of the first sensing pattern SP1 and the second sensing pattern SP2 may define a plurality of mesh holes. The mesh lines may have a three-layer structure of titanium/aluminum/titanium.

In the display device according to an embodiment of the present disclosure, the input sensor ISU may be directly disposed on the display panel DP. Herein, the term "directly disposed" means that an adhesive film need not be disposed between the input sensor ISU and the display panel DP. For example, the input sensor ISU may be formed on the display panel DP via the subsequent process. In such a case, the input sensor ISU may be expressed as an input sensing layer.

A portion where the first electrode AE and the light-emitting layer EML are disposed may be referred to as a pixel area PXA. The pixel areas PXA of FIG. 7 may be spaced apart from each other in each of the first direction DR1 and the second direction DR2 in correspondence with the pixels PX of FIG. 5. A non-pixel area NPXA may be disposed between the pixel areas PXA and may surround the pixel area PXA.

The anti-reflection panel RPP may be disposed on a top surface of the input sensor ISU. As an example of the present disclosure, the anti-reflection panel RPP may include a polarizing film, without limitation thereto. The anti-reflection panel RPP may further include a protective film and/or other functional films in addition to the polarizing film, which may be shown in the figure for convenience of description, infra. The adhesive member AD1 may be disposed between the anti-reflection panel RPP and the input sensor ISU. Moreover, the anti-reflection panel RPP may be coupled to the input sensor ISU by the adhesive member AD1. The window WM may be coupled onto the anti-reflection panel RPP via the adhesive member AD2.

Referring back to FIG. 6, the input sensor ISU may be a capacitive touch sensor. For example, one of the first to fourteenth transmission electrodes TE1 to TE14 and the first to tenth reception electrodes RE1 to RE10 may receive a transmission signal, and another may output an amount of change in capacitance between the first to fourteenth transmission electrodes TE1 to TE14 and the first to tenth reception electrodes RE1 to RE10 as a sensing signal. For example, when the first transmission electrode TE1 receives driving signal such as the transmission signal, the first transmission electrode TE1 may be capacitively coupled to the first to tenth reception electrodes RE1 to RE10. When the user's body part may be located on a specific reception electrode, for example, the first reception electrode RE1, among the first to tenth reception electrodes RE1 to RE10, a capacity between the first transmission electrode TE1 and the first reception electrode RE1 may be changed. The readout circuit ROC of FIG. 2 may calculate coordinate information of a user's touch position by detecting the changed capacity of the sensing signal received from the first reception line RL1 connected to the first reception electrode RE1.

Figure 8:
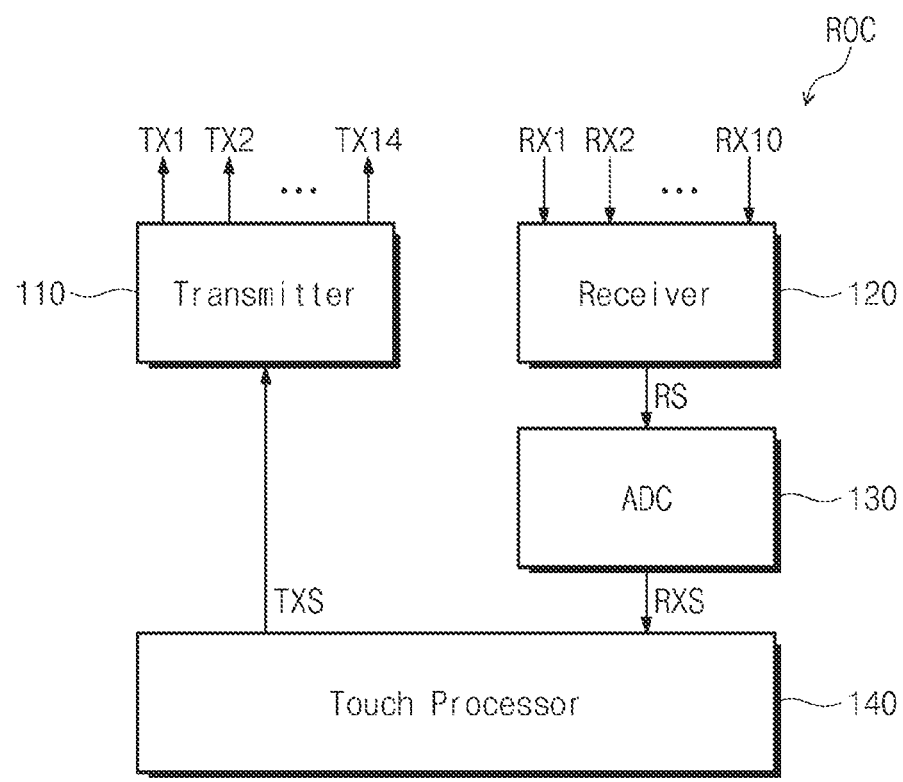
FIG. 8 is a block diagram showing a circuit configuration of a readout circuit according to an embodiment of the present disclosure.

FIG. 8 illustrates a circuit configuration of the readout circuit ROC according to an embodiment of the present disclosure.

Referring to FIG. 8, the readout circuit ROC may include a transmitter 110, a receiver 120, an analog-to-digital converter 130, and a touch processor 140.

The touch processor 140 may control operations of the transmitter 110, the receiver 120, and the analog-to-digital converter 130.

The touch processor 140 may generate an output signal TXS to be transmitted to the input sensor ISU of FIG. 6, and receive a signal received from the input sensor ISU as a digital sensing signal RXS.

The transmitter 110 converts the output signal TXS provided from the touch processor 140 into first to fourteenth transmission signals TX1 to TX14 and outputs the converted signals. The first to fourteenth transmission signals TX1 to TX14 may be provided to the first to fourteenth transmission electrodes TE1 to TE14 via the first to fourteenth transmission lines TL1 to TL14 shown in FIG. 6.

The receiver 120 receives first to tenth reception signals RX1 to RX10 from the first to tenth reception lines RL1 to RL10 shown in FIG. 6 and outputs a reception sensing signal RS.

The analog-to-digital converter 130 converts the reception sensing signal RS into a digital signal and outputs the digital sensing signal RXS. The digital sensing signal RXS may be provided to the touch processor 140.

The touch processor 140 may calculate coordinate information for the user's input TC from the input sensor ISU based on the output signal TXS and the digital sensing signal RXS.

Figure 9:
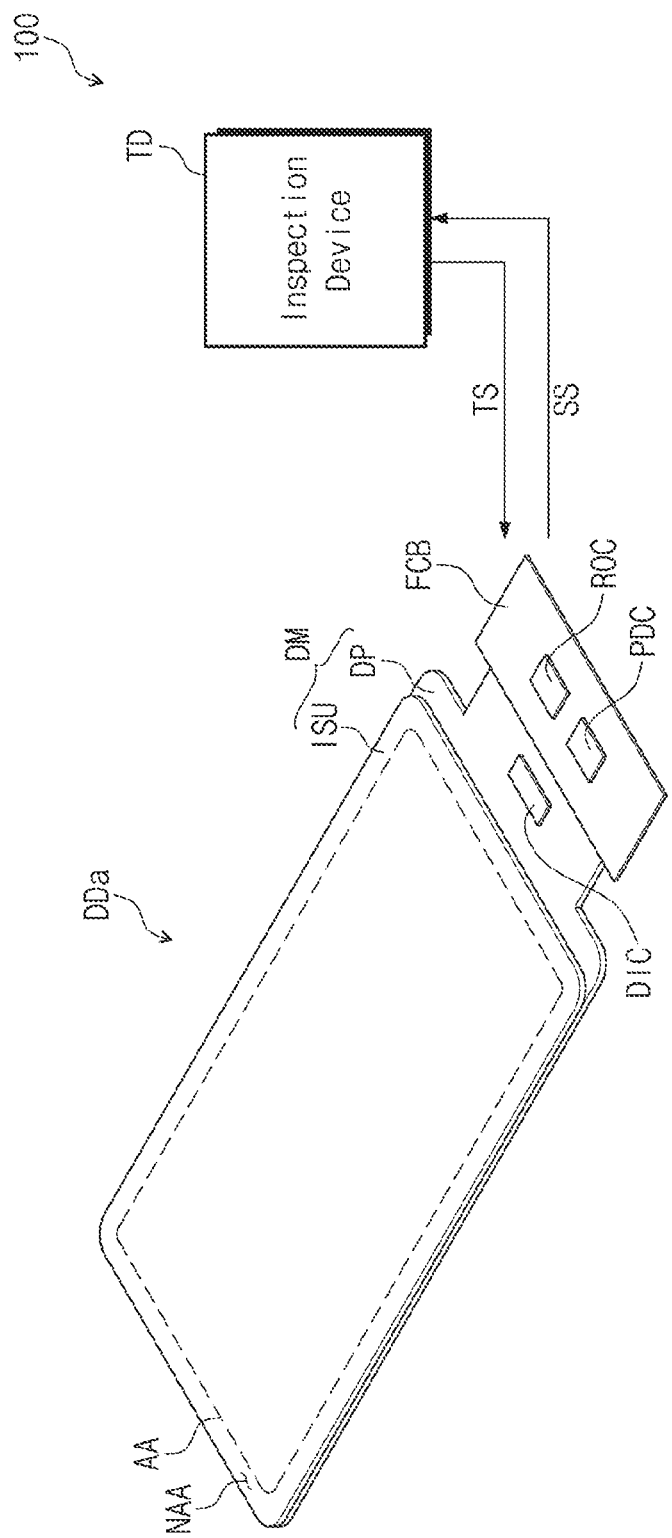
FIG. 9 is a hybrid perspective-block diagram showing an inspection system according to an embodiment of the present disclosure.

FIG. 9 illustrates an inspection system 100 according to an embodiment of the present disclosure.

Referring to FIG. 9, the inspection system 100 may include a display device DDa and an inspection device TD.

The display device DDa shown in FIG. 9 may have the same configuration as the display device DD shown in FIG. 2. The display device DDa may be in a state in which the display module DM and the printed circuit board FCB are coupled to each other to inspect characteristics of the display panel DP and the input sensor ISU at a production stage. In an embodiment, the inspection device TD may inspect the display panel DP and the input sensor ISU of the display module DM in a state in which the display module DM and the printed circuit board FCB are not coupled to each other. The process of inspecting the characteristics of the display panel DP and the input sensor ISU of the present disclosure may be performed after the coupling of the display module DM and the printed circuit board FCB, without limitation thereto, but also at a previous stage.

Although briefly shown in FIG. 9, the display device DDa and the inspection device TD may be electrically connected to each other via a cable for inspection or the like.

The inspection device TD may provide an inspection signal TS to the display panel DP via the panel driving circuit PDC. The inspection device TD may receive a sensing signal SS from the input sensor ISU via the readout circuit ROC. The readout circuit ROC may output the sensing signal SS corresponding to the first to tenth reception signals RX1 to RX10 of FIG. 8.

As shown in FIG. 7, the input sensor ISU may be disposed adjacent to the circuit element layer DP-CL of the display panel DP. The signal lines SGL shown in FIG. 5 are arranged on the circuit element layer DP-CL.

Because the first sensing patterns SP1 in FIG. 6, and the second sensing patterns SP2 in FIG. 6, of the input sensor ISU are formed as the conductive layers, the signals transmitted via the signal lines SGL may affect the input sensor ISU.

As described above, the input sensor ISU obtains the location information of the external input via the change in the mutual capacitance between the first to fourteenth transmission electrodes TE1 to TE14 and the first to tenth reception electrodes RE1 to RE10. When the first to fourteenth transmission electrodes TE1 to TE14 and the first to tenth reception electrodes RE1 to RE10 are affected by a capacitance with the circuit element layer DP-CL, it may be challenging for the input sensor ISU to accurately sense the external input.

For example, one method for minimizing deterioration in sensing performance of the input sensor ISU may be to change a driving frequency of the input sensor ISU. That is, when the image may be displayed on the display panel DP, a noise of the input sensor ISU may be measured and the driving frequency of the input sensor ISU suitable for minimizing the noise may be adopted.

The inspection device TD may provide the inspection signal TS to the display panel DP and determine the noise of the input sensor ISU based on the sensing signal SS received from the input sensor ISU.

Despite such efforts, when the noise of the input sensor ISU may be greater than a reference value, the display device DDa may be determined to be defective.

Figure 10:
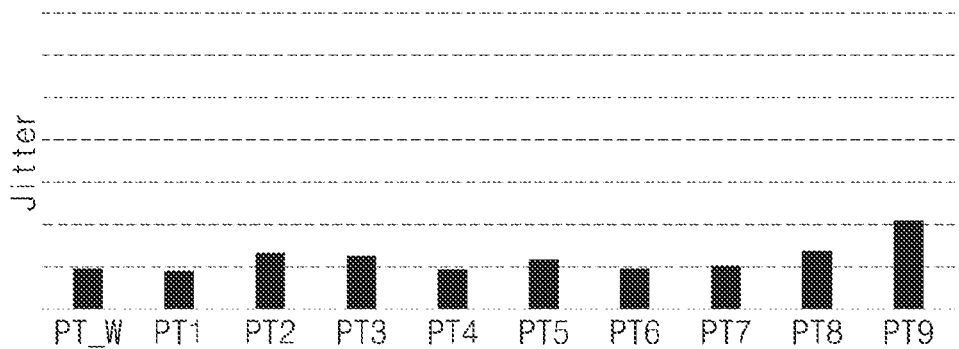
FIG. 10 is a graphical diagram illustrating a jitter noise based on an image pattern provided from an inspection device to a display panel as an example.

FIG. 10 illustrates a noise based on an image pattern provided from the inspection device TD to the display panel DP as an example.

Referring to FIGS. 9 and 10, the inspection device TD provides various image patterns PT_W and PT1 to PT9 to the display panel DP. The inspection device TD measures the noise of the input sensor ISU based on the sensing signal SS received while each of the image patterns PT_W and PT1 to PT9 may be provided. FIG. 10 shows a jitter noise of the input sensor ISU as an example.

In an embodiment, the image pattern PT_W may be a white image pattern. In an embodiment, the image patterns PT1 to PT9 may be various image patterns suitable for inspecting the characteristics of the input sensor ISU, such as a red image pattern, a green image pattern, a blue image pattern, a black image pattern, a dot image pattern, a zebra image pattern, and the like.

For example, noise such as the jitter noise for each of the image patterns PT_W and PT1 to PT9 shown in FIG. 10 is an illustrative example for ease of understanding, without limitation thereto.

In an embodiment, the inspection device TD sequentially provides the various image patterns PT_W and PT1 to PT9 to the display panel DP, and determines whether the input sensor ISU may be defective based on the sensing signal SS received from the input sensor ISU.

However, to minimize a time required for the production process, the inspection device TD might use one of the various image patterns PT_W and PT1 to PT9 to determine whether the input sensor ISU may be defective, without limitation thereto.

In the example shown in FIG. 10, when the inspection signal TS corresponding to the image pattern PT9 that may be the zebra image pattern may be provided to the display panel DP, the jitter noise of the input sensor ISU may be the greatest. The jitter noise of the sensing signal SS received while the inspection device TD provides the image pattern PT_W that may be the white image pattern to the display panel DP may be equal to or smaller than a reference value. In such a case, the display device DDa may be determined to be non-defective. However, when an image of the zebra image pattern may be displayed on the display panel DP, the input sensor ISU need not normally sense the user's touch.

Figure 11:
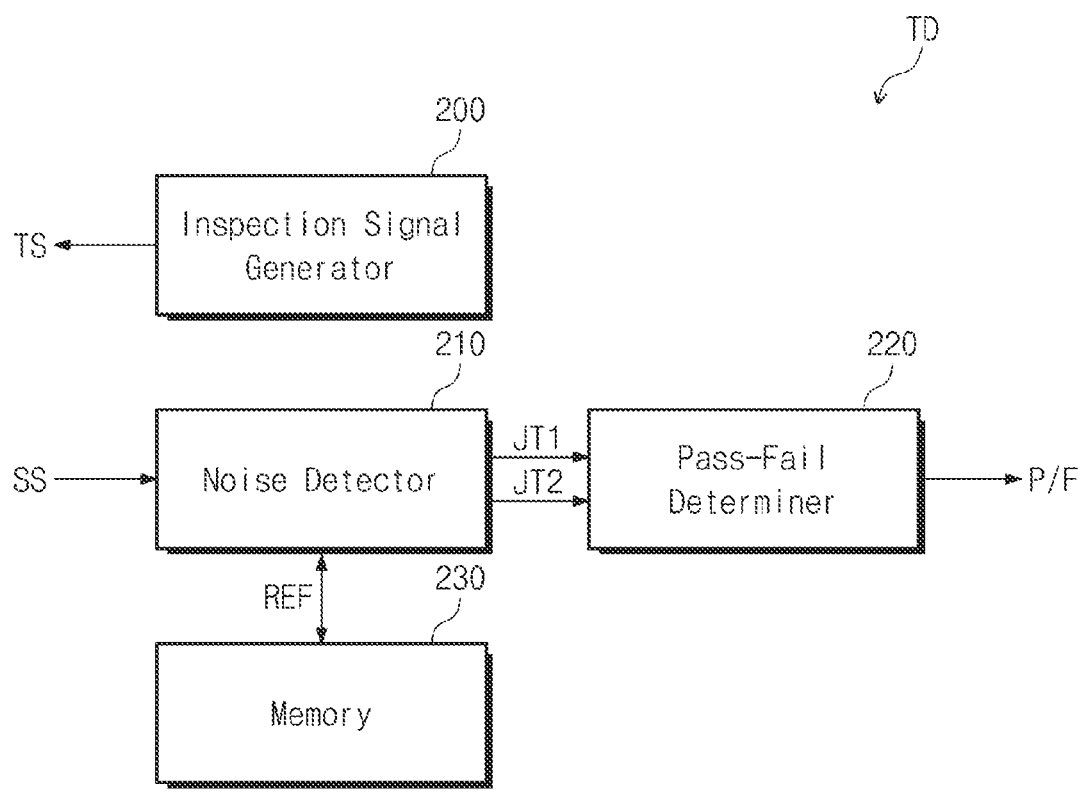
FIG. 11 is a block diagram of an inspection device according to an embodiment of the present disclosure.

FIG. 11 illustrates an inspection device according to an embodiment of the present disclosure.

Referring to FIGS. 9 and 11, the inspection device TD may include an inspection signal generator 200, a noise detector 210, a pass-fail determiner 220, and a memory 230.

The inspection signal generator 200 outputs the inspection signal TS. The inspection signal TS may be provided to the display panel DP.

The noise detector 210 receives the sensing signal SS from the input sensor ISU and detects the noise of the input sensor ISU based on the sensing signal SS.

In an embodiment, the sensing signal SS may be the capacitance or mutual capacitance between the first to fourteenth transmission electrodes TE1 to TE14 and the first to tenth reception electrodes RE1 to RE10 shown in FIG. 6.

The inspection device TD may perform a sampling process for non-defective products and an inspection process.

In the sampling process for the non-defective products, the display device DDa may be a non-defective display device. In the inspection process, the display device DDa may be a display device to be inspected.

During the sampling process for the non-defective products, the noise detector 210 stores the sensing signal SS of the display device DDa determined to be non-defective in the memory 230 as a reference signal REF.

During the inspection process, the noise detector 210 detects a first noise JT1 based on the sensing signal SS and calculates a second noise JT2 based on the sensing signal SS and the reference signal REF from the memory 230.

The pass-fail determiner 220 outputs a pass-fail signal P/F indicating whether the display device DDa may be non-defective or defective based on the first noise JT1 and the second noise JT2. In an embodiment, the display device DDa may be non-defective when the pass-fail signal P/F may be at a first level such as a low level, and the display device DDa may be defective when the pass-fail signal P/F may be at a second level such as a high level.

For example, the pass-fail determiner may be configured to determine a defect of a display device based on a first noise and a second noise, where the reference signal is a sensing signal from the input sensor of a previous non-defective display device, responsive to an inspection signal indicative of the second image pattern. Moreover, the noise detector may calculate the second noise based on the sensing signal and the reference signal.

Figure 12:
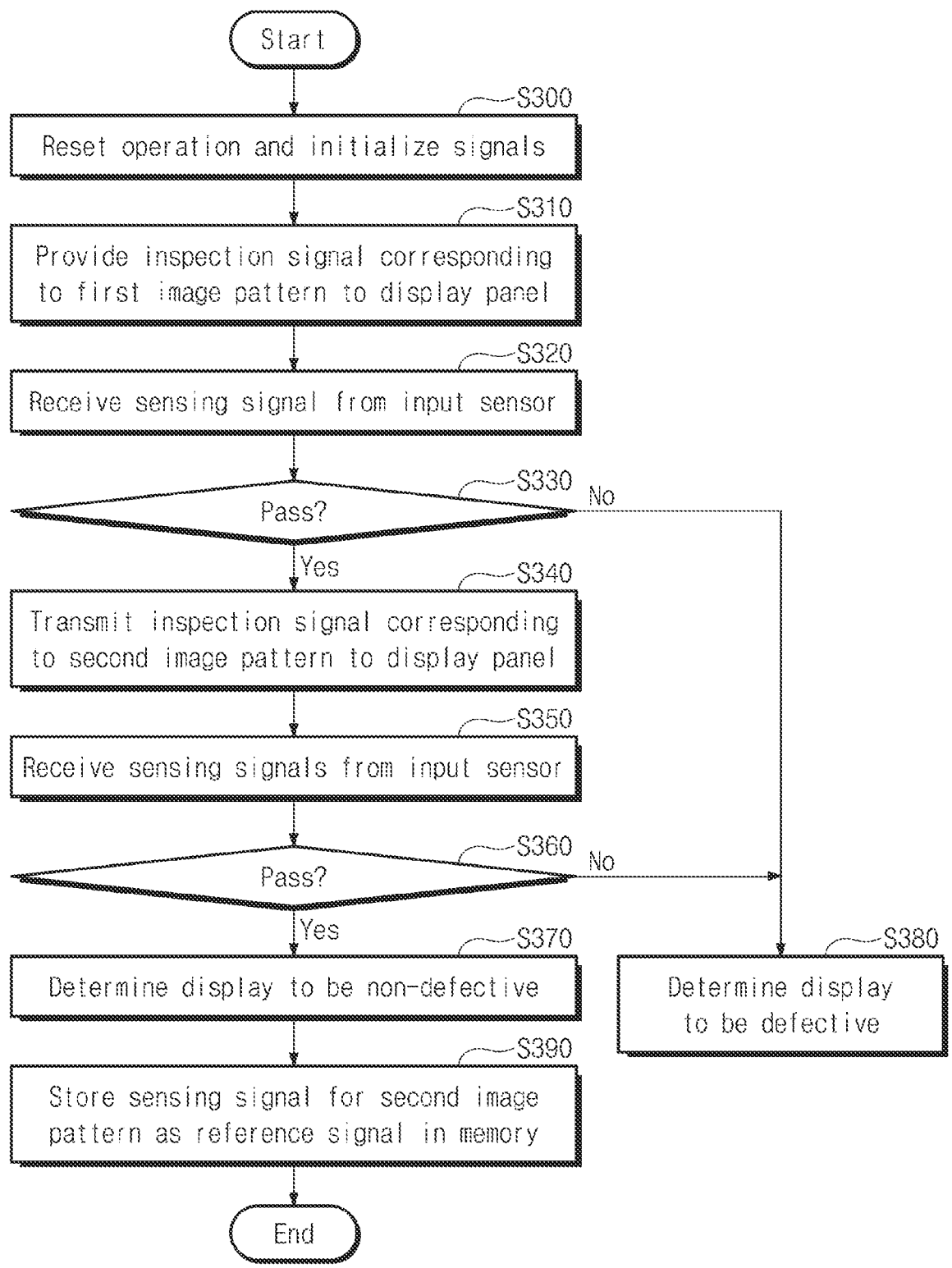
FIG. 12 is a flowchart diagram of a sampling process for non-defective products of an inspection device.

FIG. 12 illustrates a sampling process for non-defective products of the inspection device TD.

FIG. 13A illustrates the sensing signal SS when the inspection signal TS corresponding to the first image pattern PT_W may be provided to the display panel DP as an example.

FIG. 13B illustrates the first noise JT1 based on the sensing signal SS shown in FIG. 13A as an example.

FIG. 14A illustrates the sensing signal SS when the inspection signal corresponding to the second image pattern PT9 may be provided to the display panel DP as an example.

FIG. 14B illustrates the first noise JT1 based on the sensing signal SS shown in FIG. 13A and the sensing signal SS shown in FIG. 14A as an example.

Referring to FIGS. 9, 11, and 12, the inspection device TD resets an operation of the display device DDa and initializes the signals at operation S300.

The inspection signal generator 200 provides the inspection signal TS corresponding to the first image pattern PT_W to the display panel DP at operation S310. In an embodiment, the first image pattern PT_W may be the image pattern PT_W described in FIG. 10, that is, the white image pattern.

The noise detector 210 receives the sensing signal SS from the input sensor ISU at operation S320.

In FIG. 13A, the 16 sensing signals SS corresponding to 4 transmission electrodes and 4 reception electrodes among the first to fourteenth transmission electrodes TE1 to TE14 and the first to tenth reception electrodes RE1 to RE10 shown in FIG. 6 are illustrated as an example, without limitation thereto.

In an embodiment, the 16 sensing signals SS shown in FIG. 13A may be capacitance values between the 4 transmission electrodes and the 4 reception electrodes among the first to fourteenth transmission electrodes TE1 to TE14 and the first to tenth reception electrodes RE1 to RE10 when there may be no user input TC of FIG. 1.

While the inspection signal generator 200 repeatedly outputs the inspection signal TS corresponding to the first image pattern PT_W for several frames, the noise detector 210 receives the sensing signals SS.

The noise detector 210 may detect the first noise JT1 based on the sensing signals SS received for at least two frames, such as for the several frames. In an embodiment, the first noise JT1 may be a difference value between the two sensing signals SS received during the two frames.

Assuming that a threshold of the jitter noise for determining the non-defective products may be ±50, in the examples shown in FIGS. 13A and 13B, the first noises JT1 corresponding to the 16 sensing signals SS are within the threshold, so that the display device DDa may be determined to be non-defective.

When an inspection of the first noise JT1 for the first image pattern PT_W passes at operation S330, the inspection signal generator 200 provides the inspection signal TS corresponding to the second image pattern PT9 to the display panel DP. In an embodiment, the second image pattern PT9 may be the image pattern PT9 described in FIG. 10, that is, the zebra image pattern.

While the inspection signal generator 200 repeatedly outputs the inspection signal TS corresponding to the second image pattern PT9 for several frames, the noise detector 210 receives the sensing signals SS at operation S350.

The noise detector 210 may detect the first noise JT1 based on the sensing signals SS received for the at least two frames, such as for the several frames. In an embodiment, the first noise JT1 may be the difference value between the two sensing signals SS received during the two frames.

When both the inspection of the first noise JT1 for the first image pattern PT_W and an inspection of the first noise JT1 for the second image pattern PT9 pass at operation S360, the pass-fail determiner 220 determines the display device DDa to be non-defective at operation S370.

When at least one of the inspection of the first noise JT1 for the first image pattern PT_W and the inspection of the first noise JT1 for the second image pattern PT9 fails at operations S330 and S360, the pass-fail determiner 220 determines the display device DDa to be defective at operation S380.

When the display device DDa may be determined to be non-defective at operation S370, the noise detector 210 stores the sensing signal SS for the second image pattern PT9 as the reference signal REF in the memory 230 at operation S390.

That is, the reference signal REF stored in the memory 230 may be the sensing signal SS for the second image pattern PT9 of the display device DDa determined to be non-defective.

Although FIG. 12 shows an example in which the sensing signal SS for the second image pattern PT9 of one display device DDa may be stored in the memory 230, embodiments of the present disclosure may be are not limited thereto.

The inspection device TD may store, in the memory 230, the sensing signal SS for the second image pattern PT9 of each of the tens to hundreds of display devices DDa determined to be non-defective. In an embodiment, the inspection device TD may finally store an average of the sensing signals SS corresponding to the tens to hundreds of display devices DDa in the memory 230.

Figure 15:
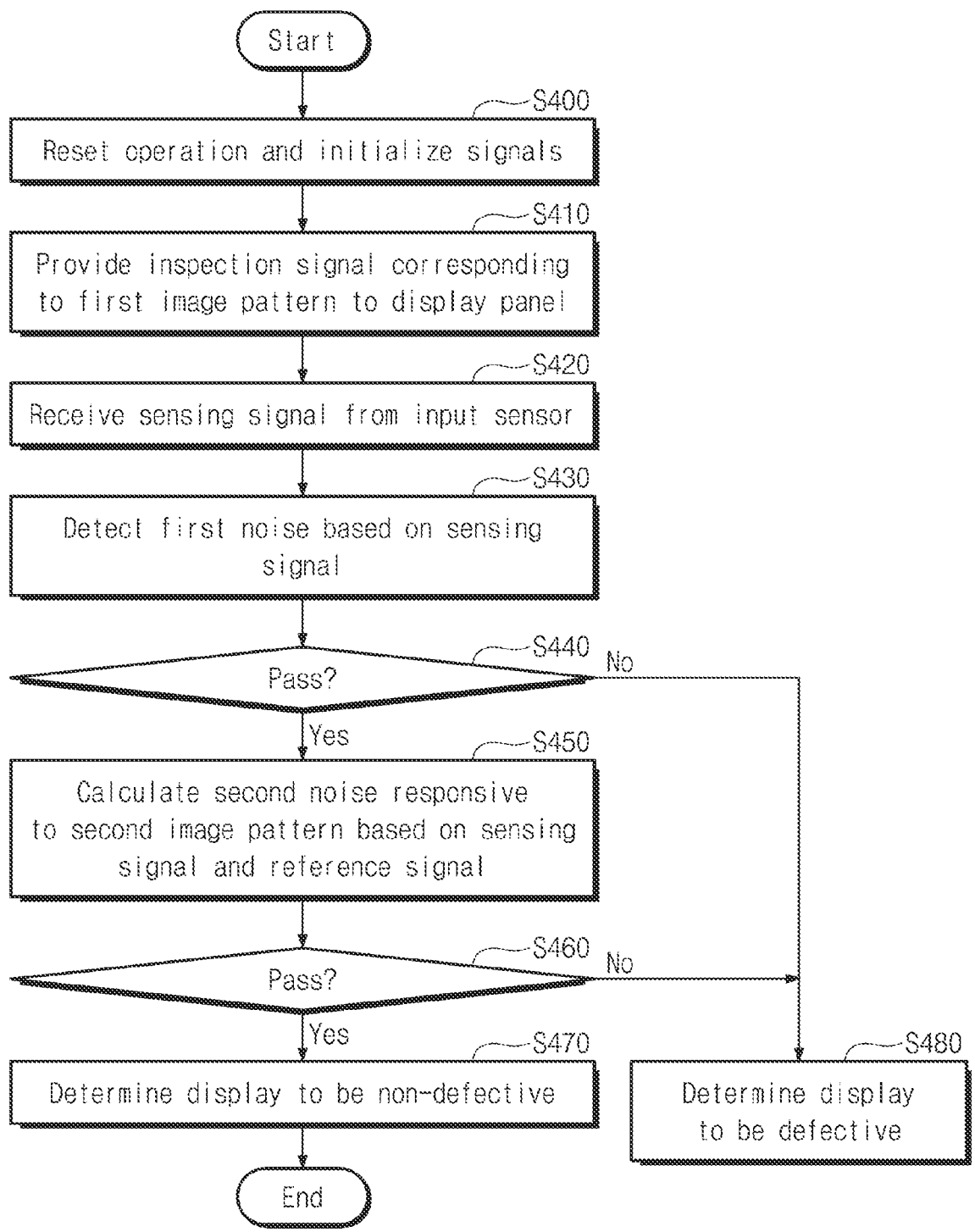
FIG. 15 is a flowchart diagram of an inspection process of an inspection device.

FIG. 15 illustrates an inspection process of the inspection device TD.

FIG. 16A illustrates the sensing signal SS when the inspection signal TS corresponding to the first image pattern PT_W may be provided to the display panel DP as an example.

FIG. 16B illustrates the first noise JT1 based on the sensing signal SS shown in FIG. 16A as an example.

FIG. 17A illustrates a reference signal stored in the memory 230 as an example.

FIG. 17B illustrates the second noise JT2 based on the sensing signal SS shown in FIG. 16A and the reference signal REF shown in FIG. 17A.

Referring to FIGS. 9, 11, and 15, the inspection device TD resets the operation of the display device DDa and initializes the signals at operation S400.

The inspection signal generator 200 provides the inspection signal TS corresponding to the first image pattern PT_W to the display panel DP at operation S410. In an embodiment, the first image pattern PT_W may be the image pattern PT_W described in FIG. 10, that is, the white image pattern.

The noise detector 210 receives the sensing signal SS from the input sensor ISU at operation S420.

In FIG. 16A, the 16 sensing signals SS corresponding to the 4 transmission electrodes and the 4 reception electrodes among the first to fourteenth transmission electrodes TE1 to TE14 and the first to tenth reception electrodes RE1 to RE10 shown in FIG. 6 are illustrated as an example, without limitation thereto.

In an embodiment, the 16 sensing signals SS shown in FIG. 16A may be the capacitance values between the 4 transmission electrodes and the 4 reception electrodes among the first to fourteenth transmission electrodes TE1 to TE14 and the first to tenth reception electrodes RE1 to RE10 when there may be no user input TC of FIG. 1.

While the inspection signal generator 200 repeatedly outputs the inspection signal TS corresponding to the first image pattern PT_W for the several frames, the noise detector 210 receives the sensing signals SS.

The noise detector 210 may detect the first noise JT1 based on the sensing signals SS received for the at least two frames, such as for the several frames, at operation S430. In an embodiment, the first noise JT1 may be the difference value between the two sensing signals SS received during the two frames.

Assuming that the threshold of the jitter noise for determining the non-defective products may be ±50, in the examples shown in FIGS. 16A and 16B, the first noises JT1 corresponding to the 16 sensing signals SS are each within the threshold, so that the display device DDa may be determined to be non-defective.

When the inspection of the first noise JT1 for the first image pattern PT_W passes at operation S430, the noise detector 210 calculates the second noise JT2 responsive to the second image pattern PT9 based on the sensing signal SS and the reference signal REF stored in the memory 230 at operation S450.

In an embodiment, the noise detector 210 outputs a difference value between the sensing signal SS shown in FIG. 16A and the reference signal REF shown in FIG. 17A as the second noise JT2.

The sensing signal SS shown in FIG. 16A may be the sensing signal SS based on the first image pattern PT_W of the display device DDa to be inspected. The reference signal REF shown in FIG. 17A may be the same as the sensing signal SS corresponding to the second image pattern PT9 of the non-defective display device DDa shown in FIG. 14A.

That is, the second noise JT2 of the display device DDa to be inspected may be predicted by comparing the sensing signal SS of the display device DDa to be inspected with the previously obtained sensing signal SS of the non-defective display device DDa.

The pass-fail determiner 220 determines whether the second noise JT2 satisfies a non-defective product standard at operation S460.

When the predicted second noise JT2 may be within the threshold for determining the non-defective products, the display device DDa to be inspected may be determined to be non-defective at operation S470.

Assuming that the threshold of the jitter noise for determining the non-defective products may be ±50, some of the second noises JT2 shown in FIG. 17B exceeds the threshold, so that the display device DDa to be inspected may be determined to be defective at operation S480.

According to an inspection method embodiment as described above, the inspection device TD may calculate the first noise JT1 corresponding to the first image pattern PT_W, as well as the second noise JT2 corresponding to the second image pattern PT9 as the inspection signal TS corresponding to the first image pattern PT_W may be provided to the display panel DP, without limitation thereto.

The display device DDa to be inspected may be determined to be defective because the second noise JT2 for the second image pattern PT9 does not satisfy the non-defective product standard as shown in FIG. 17B even when the first noise JT1 for the first image pattern PT_W satisfies the non-defective product standard as shown in FIG. 16B.

The inspection device TD of the present disclosure may accurately inspect the display device DDa without increasing an inspection time during the production process.

Herein, it has been described that the first image pattern PT_W may be the white image pattern and the second image pattern PT9 may be the zebra image pattern as an example, but the present disclosure need not be limited thereto. The first image pattern PT_W and the second image pattern PT9 may be the various image patterns suitable for inspecting the characteristics of the input sensor ISU, such as the red image pattern, the green image pattern, the blue image pattern, the black image pattern, the dot image pattern, the zebra image pattern, and the like.

In addition, herein, it has been described that the sensing signal SS corresponding to the second image pattern PT9 of the non-defective display device DDa may be stored in the memory 230 as the reference signal REF, but the present disclosure need not be limited thereto. Sensing signals corresponding to at least two image patterns of the non-defective display device DDa may be stored in the memory 230 as the reference signals REF.

In such a case, the inspection device TD may calculate the second noise JT2 and a third noise based on a difference between the sensing signal SS corresponding to the first image pattern PT_W of the display device DDa to be inspected and the at least two reference signals, and determine whether the display device DDa to be inspected may be non-defective.

The inspection system having such a configuration may inspect the characteristics of the input sensor while providing the inspection signal to the display panel. In particular, the inspection signal of the first image pattern may be provided to the display panel, and the characteristics of the input sensor for the first image pattern as well as the second image pattern may be inspected. Moreover, a defect detection performance of the input sensor may be improved during a limited inspection time.

Although the description has been made by way of example with reference to illustrative embodiments, those of ordinary skill in the pertinent art will understand that the present disclosure may be modified and changed in various ways without departing from the spirit and scope of the present disclosure. For example, the described embodiments and equivalents thereof may be combined in part or in whole to form additional embodiments. Moreover, the technical scope of the present disclosure shall not be limited to the illustrative embodiments described above, but shall be determined by the breadth of the following claims.

What is claimed is:

1. An inspection system comprising:
at least one display device product comprising a display panel and an input sensor; and
an inspection device comprising:
an inspection signal generator configured to provide to the display panel an inspection signal indicative of a first image pattern;

a memory configured to store a reference signal responsive to a second image pattern; and a noise detector configured to receive from the input sensor a sensing signal responsive to the first image pattern, detect a first noise based on the sensing signal, and detect a second noise based on the reference signal, wherein the inspection device determines a defect of the display device product based on the first noise and the second noise, wherein the reference signal is a sensing signal from the input sensor of a previous non-defective display device product responsive to an inspection signal indicative of the second image pattern, wherein the noise detector calculates the second noise based on the sensing signal and the reference signal.

2. The inspection system of claim 1, further comprising:
a pass-fail determiner configured to determine the defect of the display device product based on the first noise and the second noise.

3. The inspection system of claim 2, wherein the pass-fail determiner outputs a pass-fail signal indicating that the display device product is non-defective when both the first noise and the second noise are within a threshold.

4. The inspection system of claim 1, wherein the first noise is a difference value between two sensing signals received when the inspection signal indicative of the first image pattern is provided to the display panel for at least two frames.

5. The inspection system of claim 1, wherein the second noise is a difference value between the sensing signal and the reference signal.

6. The inspection system of claim 1,
wherein the input sensor includes a transmission electrode and a reception electrode,
wherein the sensing signal is indicative of a capacitance between the transmission electrode and the reception electrode.

7. The inspection system of claim 1, wherein the first image pattern is a white image pattern.

8. The inspection system of claim 1, wherein the input sensor is disposed on the display panel and includes a plurality of transmission electrodes and a plurality of reception electrodes.

9. The inspection system of claim 8, further comprising:
a readout circuit for providing transmission signals to the plurality of transmission electrodes and receiving reception signals from the plurality of reception electrodes,
wherein the readout circuit outputs the reception signals as the sensing signals.

10. An inspection method comprising:
providing an inspection signal indicative of a first image pattern to a display panel of a display device product;
receiving a sensing signal from an input sensor of the display device product;
determining a defect of the display device product based on a first noise of the sensing signal;
providing the inspection signal indicative of a second image pattern to the display panel;
receiving the sensing signal responsive to the second image pattern from the input sensor;
determining the defect of the display device product based on a second noise of the sensing signal; and
storing the sensing signal responsive to the second image pattern as a reference signal in a memory when the display device product is non-defective,
wherein the second noise is calculated based on the sensing signal and the reference signal corresponding to a sensing signal from the input sensor of a previous non-defective display device product responsive to an inspection signal indicative of the second image pattern.

11. The inspection method of claim 10, wherein the first noise is a difference value between two sensing signals received when the inspection signal indicative of the first image pattern is provided to the display panel for at least two frames.

12. The inspection method of claim 11, wherein the second noise is a difference value between two sensing signals received while the inspection signal indicative of the second image pattern is provided to the display panel for the at least two frames.

13. The inspection method of claim 10,
wherein the input sensor includes a transmission electrode and a reception electrode,
wherein the sensing signal is indicative of a capacitance between the transmission electrode and the reception electrode.

14. The inspection method of claim 10, wherein the first image pattern is a white image pattern.

15. An inspection method comprising:
providing an inspection signal indicative of a first image pattern to a display panel of a display device product;
receiving a sensing signal from an input sensor of the display device product;
detecting a first noise for the sensing signal;
calculating a second noise responsive to a second image pattern based on the sensing signal and a reference signal stored in a memory;
receiving the sensing signal from the input sensor; and
determining a defect of the display device product based on the first noise and the second noise,
wherein the reference signal is a sensing signal from the input sensor of a previous non-defective display device product responsive to an inspection signal indicative of the second image pattern.

16. The inspection method of claim 15, wherein the first noise is a difference value between two sensing signals received while the inspection signal indicative of the first image pattern is provided to the display panel for at least two frames.

17. The inspection method of claim 15, wherein the second noise is a difference value between the sensing signal and the reference signal.

18. The inspection method of claim 15,
wherein the input sensor includes a transmission electrode and a reception electrode,
wherein the sensing signal is indicative of a capacitance between the transmission electrode and the reception electrode.

19. The inspection method of claim 15, wherein the input sensor is disposed on the display panel and includes a plurality of transmission electrodes and a plurality of reception electrodes.

20. The inspection method of claim 15, wherein the determining of the defect of the display device product based on the first noise and the second noise comprises:
determining the display device product to be non-defective when both the first noise and the second noise are within a threshold.

* * * * *